United States Patent
Xue et al.

(10) Patent No.: US 11,256,000 B2
(45) Date of Patent: Feb. 22, 2022

(54) METHOD AND SYSTEM FOR DETERMINING CLOUD SEEDING POTENTIAL

(71) Applicant: University Corporation for Atmospheric Research, Boulder, CO (US)

(72) Inventors: Lulin Xue, Broomfield, CO (US); Roy M. Rasmussen, Longmont, CO (US); Sarah Anne Tessendorf, Longmont, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 387 days.

(21) Appl. No.: 16/250,807

(22) Filed: Jan. 17, 2019

(65) Prior Publication Data

US 2020/0233115 A1    Jul. 23, 2020

(51) Int. Cl.
| | |
|---|---|
| *A01G 15/00* | (2006.01) |
| *G06F 17/10* | (2006.01) |
| *G01W 1/10* | (2006.01) |
| *G01W 1/04* | (2006.01) |

(52) U.S. Cl.
CPC ............ *G01W 1/04* (2013.01); *A01G 15/00* (2013.01); *G01W 1/10* (2013.01); *G06F 17/10* (2013.01); *G01W 2201/00* (2013.01)

(58) Field of Classification Search
CPC ..... G01W 1/04; G01W 1/10; G01W 2201/00; A01G 15/00; G06Q 10/04; G06F 17/10; G06F 17/18
See application file for complete search history.

(56) References Cited

PUBLICATIONS

Luenam, Pramote, et al. "A neuro-fuzzy approach for daily rainfall prediction over the central region of Thailand." Proceedings of the International Multiconferance of Engineers and Computer Scientists 1 (2010): 17-19. (Year: 2010).*

Hong, Song-You, Yign Noh, and Jimy Dudhia. "A new vertical diffusion package with an explicit treatment of entrainment processes ." Monthly weather review 134.9 (2006): 2318-2341. (Year: 2006).*

Sarah Tessendorf, Roy Rasmussen, Dan Breed, Lulin Xue, Courtney Weeks, Kyoko Ikeda, Duncan Axisa, Don Griffith, David Yorty, Shauna Ward, Ryan Erickson, Weather Modification Feasibility-Wyoming Range Level II Phase II Study, National Center for Atmospheric Research, May 3, 2016.

* cited by examiner

*Primary Examiner* — Yoshihisa Ishizuka
*Assistant Examiner* — Carter W Ferrell
(74) *Attorney, Agent, or Firm* — The Ollila Law Group LLC

(57) ABSTRACT

A method and system for determining cloud seeding potential comprises receiving a temperature and a liquid water content (LWC). A seeding index is calculated based on the temperature T, a temperature membership function $f(T)$, the LWC, and a liquid water content membership function $f(LWC)$ at the plurality of grid points to create a seeding index set. A target region potential flag is set based on the seeding index set.

16 Claims, 9 Drawing Sheets

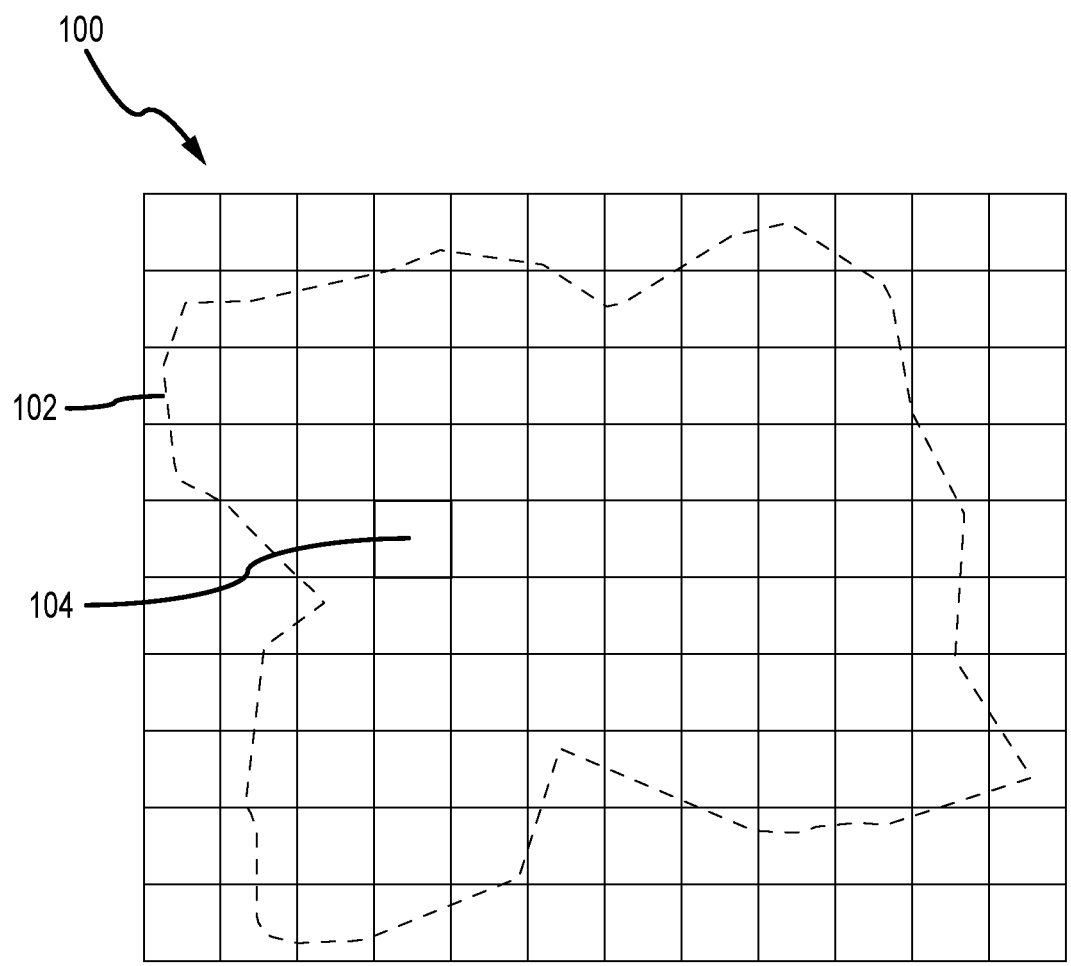
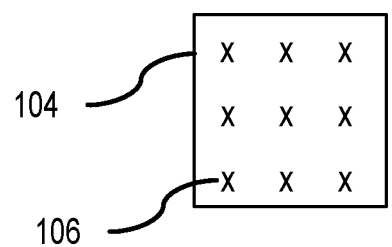
FIG.1

PROCESSING SYSTEM 300

STORAGE SYSTEM 304

| | |
|---|---|
| TEMPERATURE (T) | 308 |
| LIQUID WATER CONTENT (LWC) | 310 |
| RELATIVE HUMIDITY WITH RESPECT TO ICE (RHi) | 312 |
| RELATIVE HUMIDITY WITH RESPECT TO WATER (RHw) | 314 |
| SEEDING INDEX (SI) | 316 |
| SEEDING INDEX (SI) SET | 318 |
| LIQUID WATER CONTENT WEIGHT ($Wt_{LWC}$) | 320 |
| RELATIVE HUMIDITY WITH RESPECT TO ICE WEIGHT ($Wt_{RHi}$) | 322 |
| RELATIVE HUMIDITY WITH RESPECT TO WATER WEIGHT ($Wt_{RHw}$) | 326 |
| TARGET REGION OPPORTUNITY FLAG | 328 |
| AVERAGE SEEDING INDEX (SI) SET VALUE | 330 |
| FIRST SEEDING INDEX (SI) THRESHOLD | 332 |
| MEAN SEEDING INDEX SET VALUE | 334 |
| MEDIAN SEEDING INDEX SET VALUE | 336 |
| $75^{th}$ PERCENTILE SEEDING INDEX (SI) SET VALUE | 338 |
| SECOND SEEDING INDEX (SI) THRESHOLD | 340 |
| DISPERSION INDEX (DI) | 342 |
| DISPERSION INDEX (DI) SET | 344 |
| WIND DIRECTION (WDIR) | 346 |
| PLANETARY BOUNDARY LAYER HEIGHT (PBLH) | 348 |
| WIND SPEED (WSPD) | 350 |
| AVERAGE DISPERSION INDEX (DI) SET VALUE | 352 |
| FIRST DISPERSION INDEX (DI) THRESHOLD | 354 |
| MEAN DISPERSION INDEX SET VALUE | 356 |
| MEDIAN DISPERSION INDEX SET VALUE | 358 |
| $75^{th}$ PERCENTILE DISPERSION INDEX (DI) SET VALUE | 360 |
| SECOND DISPERSION INDEX (DI) THRESHOLD | 362 |

INTERFACE 306

FIG.3

METHOD AND SYSTEM FOR DETERMINING CLOUD SEEDING POTENTIAL

TECHNICAL FIELD

The examples described below relate to a method and system for cloud seeding. More particularly, the examples are directed to a method and system for determining cloud seeding potential for a target region.

BACKGROUND

Cloud seeding is a form of weather modification, a way of changing the amount or type of precipitation that falls from clouds. By dispersing substances into the air that serve as cloud condensation or ice nuclei, it is possible to modify the microphysical processes within the cloud. Cloud seeding can be of value for its ability to increase precipitation, for example for a ski area or a water basin managed by a utility, and it can also be of value for its ability to decrease precipitation or fog, for example near to an airport.

The most common chemicals used for cloud seeding include silver iodide, potassium iodide and dry ice (solid carbon dioxide). Introduction of silver iodide, AgI, which has a crystalline structure similar to that of ice, can induce freezing nucleation.

Cloud seeding chemicals may be dispersed by aircraft or by dispersion devices located on the ground (generators or canisters fired from anti-aircraft guns or rockets). For release by aircraft, silver iodide flares may be ignited and dispersed as an aircraft flies through the inflow of a cloud. When released by devices on the ground, the fine particles are carried downwind and upward by air currents after release.

Cloud seeding requires specialized equipment and hours of human operator time. It is therefore only worth pursuing if the benefits of cloud seeding outweigh the costs. In order to maximize the benefits over the costs, it is necessary to identify regions with potential for cloud seeding success with a high level of confidence.

Previously, human forecasters identified where cloud seeding opportunities were found manually. Forecasters did this by synthesizing model data and hand-picking target areas to seed. Prior cloud seeding methods also included applying hard thresholds to the output of weather models to identify time periods and regions for seeding with a high confidence level.

While prior methods could identify cloud seeding opportunities in strongly forced, large-scale weather scenarios, there are additional situations where cloud seeding opportunities exist under weaker or local-scale meteorological forcing that can result in lower intensity storms. Prior cloud seeding methods did not consistently identify such cloud seeding opportunities in the lower intensity storms, partly due to lower confidence in the forecast such that the deployment of cloud seeding resources may not be worthwhile.

What is needed is a way to identify cloud seeding opportunities at a high confidence level in all weather scenarios.

SUMMARY

According to an embodiment a method for determining whether a target region provides a cloud seeding opportunity is provided. The method comprises receiving a temperature T for each respective grid point of a plurality of grid points within the target region, receiving a liquid water content (LWC) for each respective grid point of the plurality of grid points. The method further comprises calculating a seeding index (SI) for each respective grid point of the plurality of grid points to determine a seeding index (SI) set for the target region, the SI being calculated based the temperature T, a temperature membership function $f(T)$, the LWC, and a liquid water content membership function $f(LWC)$, and setting a target region potential flag based on the SI set.

According to an embodiment, a system for determining whether a target region provides a cloud seeding opportunity is provided. The system comprises a data receiving module configured to receive a temperature T for each respective grid point of a plurality of grid points within the target region, to receive a liquid water content (LWC) for each respective grid point of the plurality of grid points. The system further comprises a seeding index module configured to calculate a seeding index (SI) for each respective grid point of the plurality of grid points to determine a seeding index (SI) set for the target region, the seeding index being calculated based on the LWC and a liquid water content membership function $f(LWC)$. The system further comprises a target region potential flagging module configured to set a target region potential flag based on the SI set.

BRIEF DESCRIPTION OF THE DRAWINGS

The same reference number represents the same element on all drawings. The drawings are not necessarily to scale.

FIG. 1 depicts potential cloud seeding region 100 in accordance with an embodiment;

FIG. 3 depicts processing system 300 in accordance with an embodiment;

DETAILED DESCRIPTION

Figure 2:
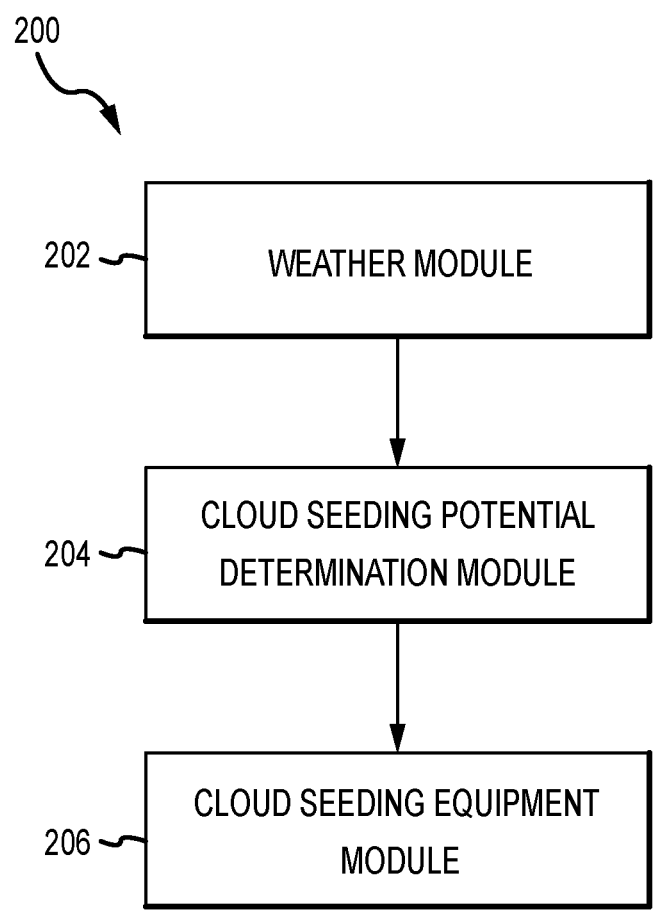
FIG. 2 depicts system 200 in accordance with an embodiment.

The present disclosure describes a method and system for determining cloud seeding potential in a target region.

FIG. 1 depicts potential cloud seeding region 100. Cloud seeding region 100 may coincide with any geographical region of interest 102. For example, cloud seeding region 100 may include a watershed area for a city.

Cloud seeding region 100 may be divided into individual target regions 104, a detail of which is depicted in FIG. 1. Each respective target region 104 may include a plurality of individual grid points 106 defining locations within that respective target region 104.

FIG. 2 depicts a weather modification system 200, in accordance with an embodiment. Weather modification system 200 includes a weather module 202, a cloud seeding potential determination module 204, and a cloud seeding equipment module 206.

Weather module 202 provides output weather data to cloud seeding potential determination module 204. The weather data may include, but is not limited to, any of the following data for one or more of the grid points within target area 104: temperature, relative humidity, wind speed, wind direction, planetary boundary layer height, precipitation rate, condensation rate, and vertical velocity. Weather module 202 may be distributed across one or more processing systems and may use any combination of predictive weather model or present weather observations to generate weather data. For example, weather module 202 may use data received from satellite, ground, weather balloon, or radar observations.

Cloud seeding potential determination module 204 may use the weather data received from weather module 202 to determine if target region 104 provides a cloud seeding opportunity within a specific time period. Target region 104 may be determined to provide an adequate cloud seeding potential when it is determined that the cloud seeding process may generate a threshold level of precipitation.

Each respective target region 104 has an associated target region potential flag that signals whether a target region 104 provides an adequate cloud seeding opportunity for a specific time period. Cloud seeding potential determination module 204 may set the target region potential flag for each respective target region 104 within geographical region of interest 102.

Cloud seeding equipment module 206 may receive a plurality of target region potential flags for the target regions 104 for geographical region of interest 102, and may provide or execute further instructions to seed those target regions. Cloud seeding equipment module 206 may, for example, provide instructions to operate cloud seeding equipment on the ground or in the air.

FIG. 3 depicts a processing system 300 according to an embodiment. Processing system 300 is an example embodiment of cloud seeding potential determination module 204. Processing system 300 may execute one or more processing routines to determine which target regions 104 of cloud seeding region 100 may provide precipitation over a predetermined level upon being seeded via ground or air. Processing system 300 includes an interface 306 and a storage system 304.

Processing system 300 may comprise a general-purpose computer, a micro-processing system, a logic circuit, or any other general purpose or customized processing device capable of performing the functions described herein. Processing system 300 may be distributed among multiple processing devices. Processing system 300 may include any manner of integral or independent electronic storage medium, such as storage system 304.

Interface 306 may receive data from weather module 202. Interface 306 may enable communications between processing system 300 and external devices. Interface 306 may be capable of any manner of electronic, optical, or wireless communication.

Storage system 304 may store parameters and data, software routines, constant values, and variable values. Storage system 304 may comprise a primary or main memory, such as a random access memory (RAM). In examples, storage system 304 may include a hard disk drive, a removable storage device, a memory card, a floppy disk drive, a magnetic tape drive, a compact disk drive, a digital versatile disc, a Blue-ray disc, an optical storage device, tape backup, or any other computer useable or readable storage medium. In examples, storage system 304 may comprise a non-transitory media.

In embodiments, the storage system 304 may include routines that are executed by the processing system 300. For example, storage system 304 may include routines that execute any portion of methods 400 and/or 500, as described below.

Storage system 304 may further store variables that may be used by routines executed by processing system 300 to identify target regions that provide adequate cloud seeding opportunities, as will be described below. For example, storage system 304 may include a target region potential flag 328 representing whether target region 104 provides an adequate cloud seeding opportunity during a particular time period. Storage system 304 may further provide: a temperature (T) 308, a liquid water content (LWC) 310, a relative humidity with respect to ice (RHi) 312, a relative humidity with respect to water (RHw) 314, a seeding index (SI) 316, a seeding index (SI) set 318, a liquid water content weight ($Wt_{LWC}$) 320, a relative humidity with respect to ice weight ($Wt_{RHi}$) 322, a relative humidity with respect to water weight ($Wt_{RHw}$) 326, a target region potential flag 328, an average seeding index (SI) set value 330, a first seeding index (SI) threshold 332, a mean seeding index set value 334, a median seeding index set value 336, a 75th percentile seeding index (SI) set value 338, a second seeding index (SI) threshold 340, a dispersion index (DI) 342, a dispersion index (DI) set 344, a wind direction (WDIR) 346, a planetary boundary layer height (PBLH) 348, a wind speed (WSPD) 350, an average dispersion index (DI) set value 352, a first dispersion index (DI) threshold 354, a mean dispersion index set value 356, a median dispersion index set value 358, a 75th percentile dispersion index (DI) set value 360, and a second dispersion index (DI) threshold 362. Each of these variables will be described in further detail below.

Figure 4:
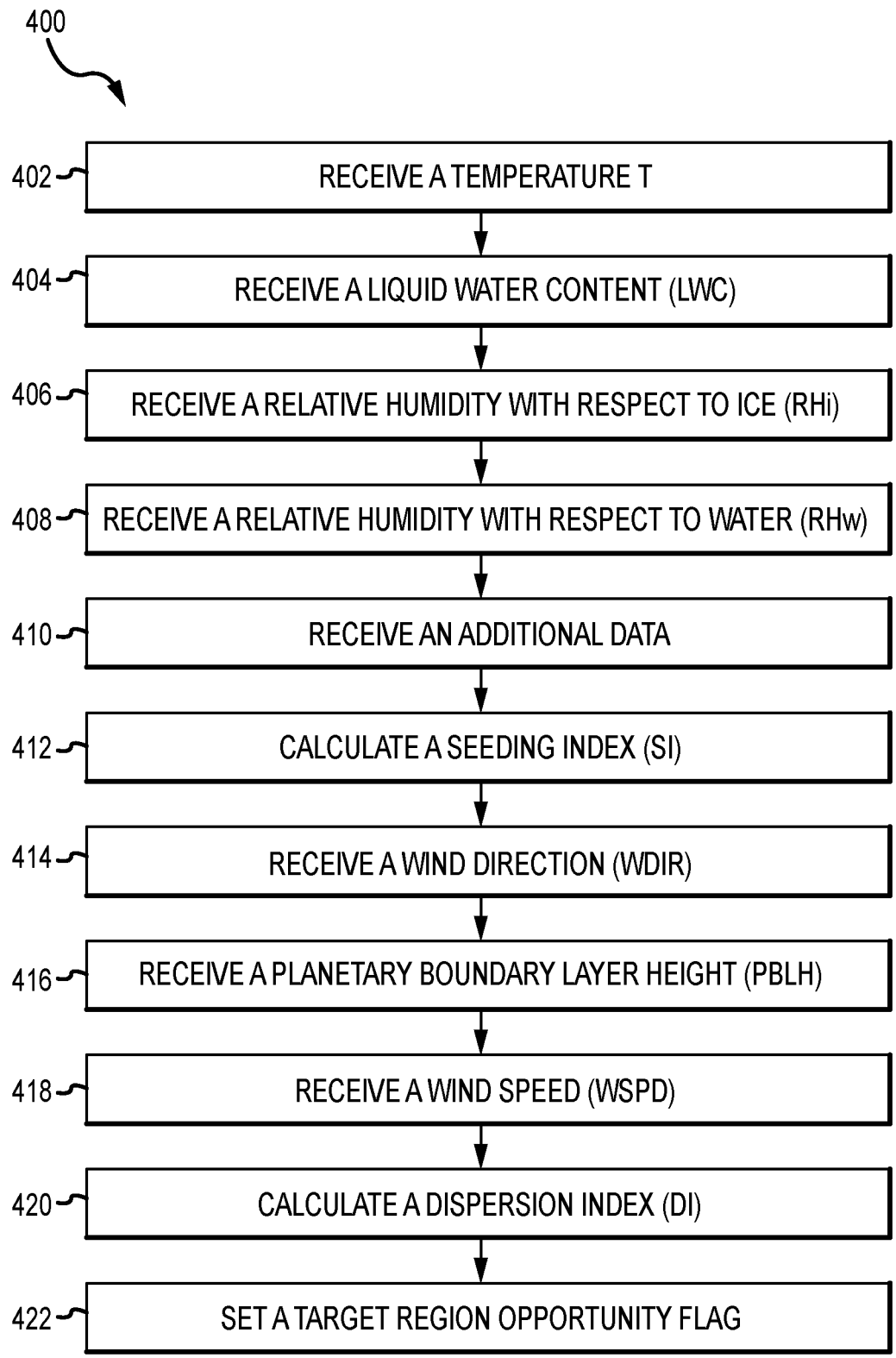
FIG. 4 depicts method 400 in accordance with an embodiment.

FIG. 4 depicts a method 400 in accordance with an embodiment. Method 400 may be used to determine cloud seeding opportunities for a target area.

Method 400 begins with steps 402 and 404. In step 402, a temperature T 308 is received for each respective grid point 106 of a plurality of grid points within the target region 104. Temperature T 308 may allow for the identification of target regions with the necessary temperature conditions required for seed nucleation.

In step 404, a liquid water content (LWC) 310 is received for each respective grid point of the plurality of grid points for a period of time. LWC 310 is a measure of the mass of the water in a cloud in a specified amount of dry air, typically measured per volume of air ($g/m^3$) or mass of air (g/kg). The period of time can cover any duration, from instantaneous to a longer integration, for example an hour. LWC 310 data may allow for the identification of inefficient ice-phase microphysical processes in a cloud.

Temperature T 308 and LWC 310 may each be received from weather module 202, and may include observed or a predictive-model generated data.

In embodiments, steps 402 and 404 will be repeated for a plurality of grid points 106 within target region 104.

Method 400 continues with step 412. In step 412, a seeding index (SI) 316 for each respective grid point 106 of the plurality of grid points is calculated to determine a seeding index (SI) set 318 for the target region 104. SI 316 may represent the potential at a grid point 106 to generate cloud seeding-generated precipitation, based on the microphysical condition during a particular time period.

SI 316 is calculated based on the temperature T 308, LWC 310, a liquid water content membership function ƒ(LWC).

A membership function ƒ(X) of criterion "X" is a curve that defines how each point in the input space is mapped to a membership value or degree of membership between 0 and 1.

Figure 6:
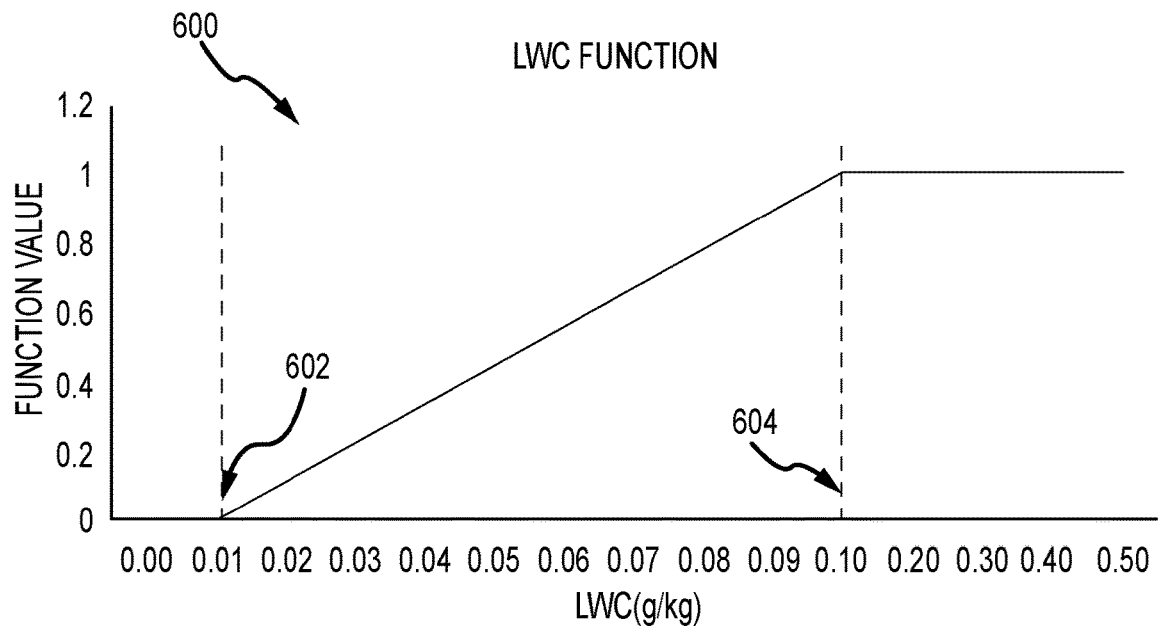
FIG. 6 depicts chart 600 in accordance with an embodiment.

FIG. 6 depicts example membership function 600 for LWC. FIG. 6 includes an x-axis providing the value of criterion "X", and a y-axis providing the value of membership function "X".

Example membership function 600 does not contribute to SI 318 for values of LWC less than LWC value 602 when y=0. Membership function 600 provides fixed values of 1 for LWC values that are greater than LWC value 604 when y=1. Between the y=0 value and y=1 values, however, membership function 600 scales between 0 and 1 for LWC. By providing fuzzy membership, membership function 600 may help determine with greater certainty when LWC contributes to potentially valuable seeding opportunities by accounting for uncertainty in the weather data.

In embodiments, SI 316 may be calculated based on the following expression:

$$SI = Wt_{LWC} * \sqrt{f(T) * f(LWC)}, \quad \text{(Equation 1)}$$

where $Wt_{LWC}$ is a liquid water content weight.

Because temperature is a necessary condition for seeding material nucleation, applying temperature membership function ƒ(T) to Equation 1 may help improve the estimation of SI 316, and therefore determine whether artificial ice nucleation is possible.

Figure 9:
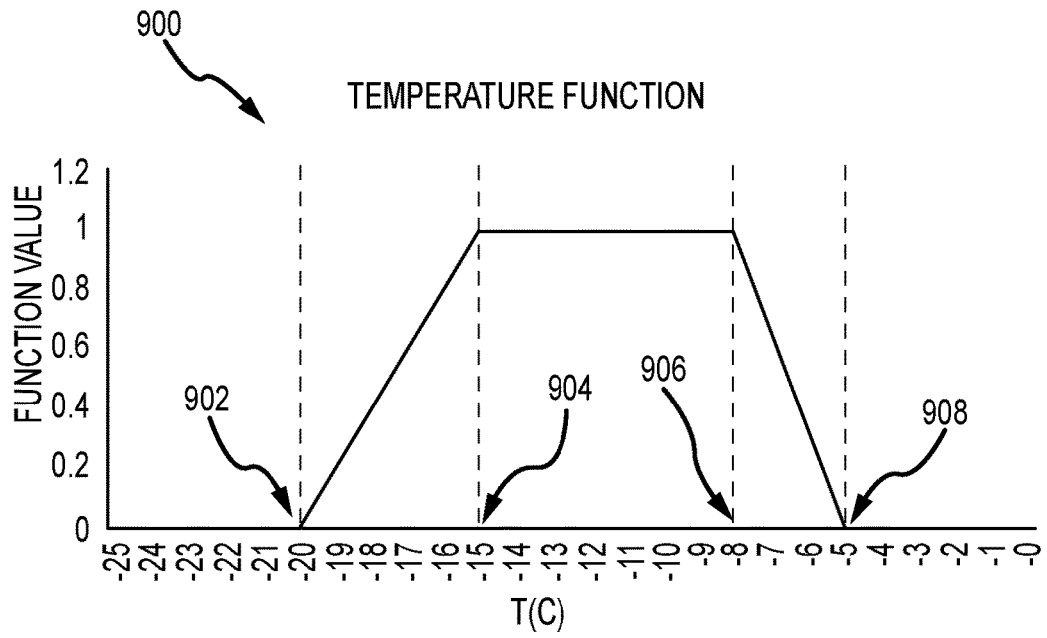
FIG. 9 depicts chart 900 in accordance with an embodiment.

FIG. 9 depicts example membership function 900 for temperature T. Membership function 900 has a fixed value of 1 for temperature T values between value 904, the left y=1 value, and value 906, the right y=1 value. For values of temperature T between the left y=0 value at 902 and the left y=1 at 904, and also the right y=1 value at 906 and right y=0 at 908, however, ƒ(T) scales between 0 and 1. For values of temperature T greater than the right y=0 value at 908 or less than the left y=0 value at 902, ƒ(T) is zero. The gradual step profile of membership function 900 may help capture the regions outside of the strongest central step feature where possible opportunities for cloud seeding could still exist given uncertainty in the weather data.

The values of example membership functions 600 and 900 are summarized in Table 1 below.

TABLE 1

| Criteria | Left y = 0 | Left y = 1 | Right y = 1 | Right y = 0 |
|---|---|---|---|---|
| LWC (g/kg) | 0.01 | 0.1 | — | — |
| T (C) | −20 | −15 | −8 | −5 |

The example membership functions provided in this application are not intended to be limiting. In examples, the example membership functions described herein may include different left y=0, left y=1, right y=0, right y=1, values, different profile shapes, non-linear regions, or any other feature known to those of skill.

The use of membership functions may help identify grid points and target regions, where conditions provide cloud seeding potential but due to uncertainties in the weather data the specific criterion fall outside of the value ranges for the strongest cloud seeding opportunities.

Equation 1 includes Wt_X, the weighting coefficient of criterion "X", weight $Wt_{LWC}$. In embodiments, $Wt_{LWC}$ is nonzero. In further embodiments $Wt_{LWC}$ may have a value less than one. In further embodiments, $Wt_{LWC}$ may have a value between zero and one.

Method 400 continues with step 422. In step 422, a target region potential flag 328 is set based on SI set 318. Target region potential flag 328 indicates whether target region 104 has the potential to provide an additional amount of precipitation over a threshold over a time period.

Upon determining which target regions 104 within a geographical region of interest 102 have a target region potential flag set 328, it may be possible to determine where to operate ground or airborne cloud seeding equipment to realize the potential for precipitation in the target regions via cloud seeding.

Figure 5:
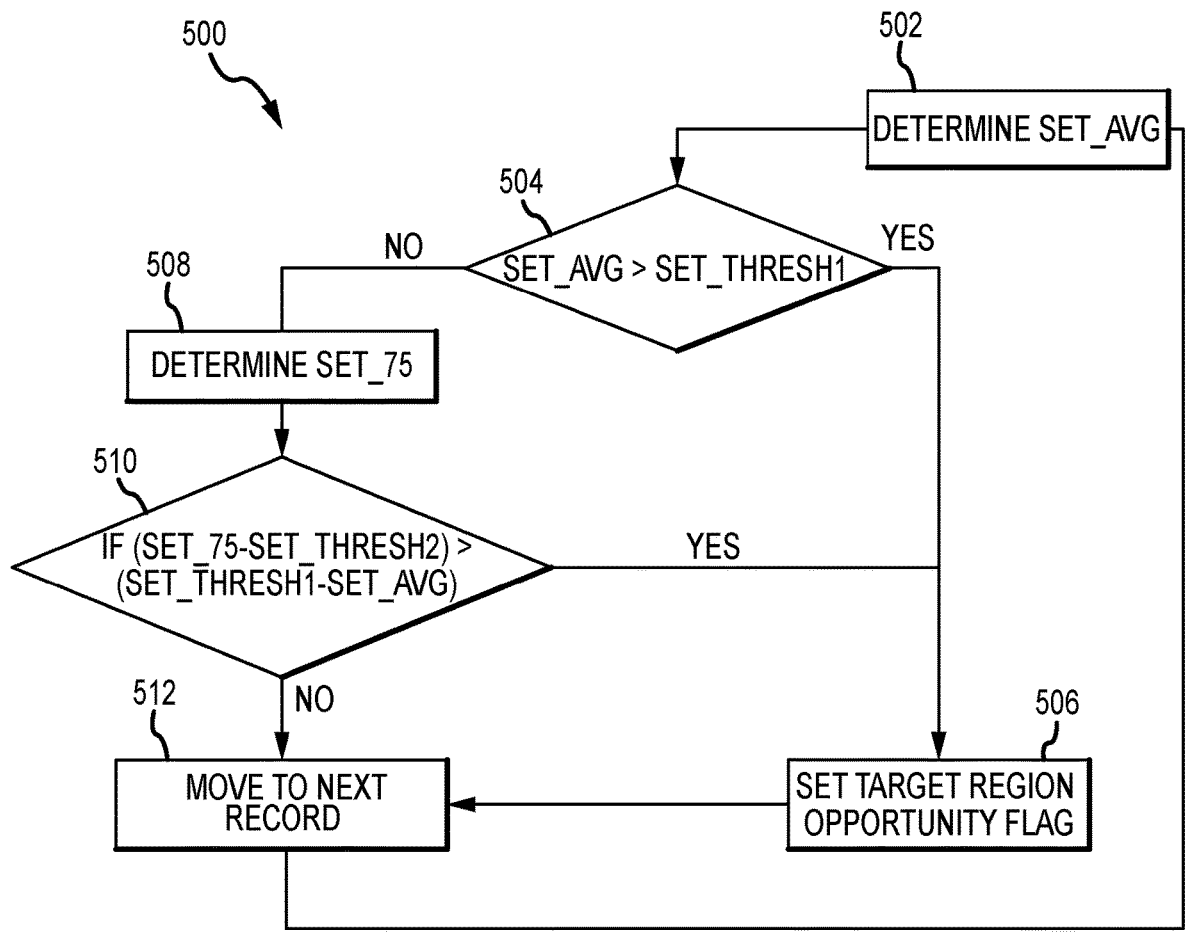
FIG. 5 depicts method 500 in accordance with an embodiment.

In examples, step 422 may include further steps. For example, step 422 may further incorporate any of the steps depicted in FIG. 5. FIG. 5 depicts a method 500 that may be used to determine if target region potential flag 318 should be set for a set data such as, for example, SI set 318.

Method 500 begins with steps 502 and 504. In step 502, an average for a set of data (set_avg) is determined. In examples, set_avg may be determined by determining the mean or median value of the set of data.

For example, if the set of data being evaluated via method 500 is SI set 318, then the set_avg is the average SI set value 330 for targeted region 104.

In step 504, the following expression may be evaluated:

$$\text{If(set\_avg>set\_thresh1),} \quad \text{(Equation 2)}$$

where set_thresh1 is a first set threshold. Equation 2 may be used to identify sets of data with set_avg values that are greater than set_thresh1.

For example, if the data set in question includes SI set 318, set_thresh1 may comprise a first seeding index (SI) threshold 332. For example, setting the first SI threshold 332 to 0.4 may allow for the identification of target regions with an average SI set value 330 over 0.4.

In embodiments, the set_avg value may be determined to be the greater of a mean data set value and a median data set value. For example, the average SI set value 330 may be determined to be the greater of a mean seeding index set value 334 and a median seeding index set value 336.

Upon determining that the set_avg is greater than set_thresh1, method 500 may continue to step 506. In step 506, target region potential flag 422 may be set for target region 104.

Upon determining that the set_avg is not greater than set_thresh1, however, method 500 may continue to step 508. In step 508, a $75^{th}$ percentile set value (set_75) may be determined. Set_75 is the highest SI value for the fourth quadrant of the ordered data set.

In examples where the data set in question is the SI set, the set_75 may be $75^{th}$ percentile seeding index (SI) set value 338.

Method 500 continues with step 510. In step 510, the following expression may be evaluated:

$$IF((set\_75-set\_thresh2)>(set\_thresh1-set\_avg)), \quad \text{(Equation 3)}$$

with set_thresh2 being a second data set threshold, and set_thresh2 being greater than set_thresh1. When steps 502, 504, 508, and 510 are executed together, it may help identify data sets with average values that are below a first data set threshold set_thresh1, but include fourth quadrant values that are above the second data set threshold set_thresh2.

In examples, set_thresh1 may equal 0.4, and set_thresh2 may equal 0.75 to identify data sets with average values that are below 0.4, and fourth quadrant percentile data values that are above 0.75. In the example of evaluating SI set 318, this may allow for the identification of target regions with low average cloud seeding potential, but with isolated subsections that have relatively high cloud seeding potential.

In examples where the data set in question is SI set 318, set_thresh 2 may be second seeding index threshold 340.

If Equation 3 is evaluated to be true at step 510, then method 500 may continue to step 506. At step 506, target region potential flag 328 may be set.

If Equation 3 is evaluated to be false at step 510, however, then method 500 may continue to step 512. In step 512, method 400 may be applied to the next record.

In examples, evaluating the next record in step 512 may include evaluating an SI_set 318 for an additional time period. This may help generate a time series of target region potential flags 318 that allow an operator to determine how the cloud seeding potential may evolve over time for a single target region.

In examples, method 400 may further include step 408. In step 408, a relative humidity with respect to water (RHw) 314 for each respective grid point of the plurality of grid points may be received. RHw 314 is the ratio of the vapor pressure to the saturation vapor pressure with respect to water. RHw 314 is usually a function of the resolved relative humidity with respect to water, and may allow for the identification of unresolved supercooled LWC on the subgrid scale.

RHw 314 may be received from weather module 202, and may include observed or a predictive-model generated data.

In this further example, SI 316 may be calculated based on the temperature T 308, LWC 310, a liquid water content membership function $f(LWC)$, the RHw 314, and a relative humidity with respect to water membership function $f(RHw)$.

Figure 8:
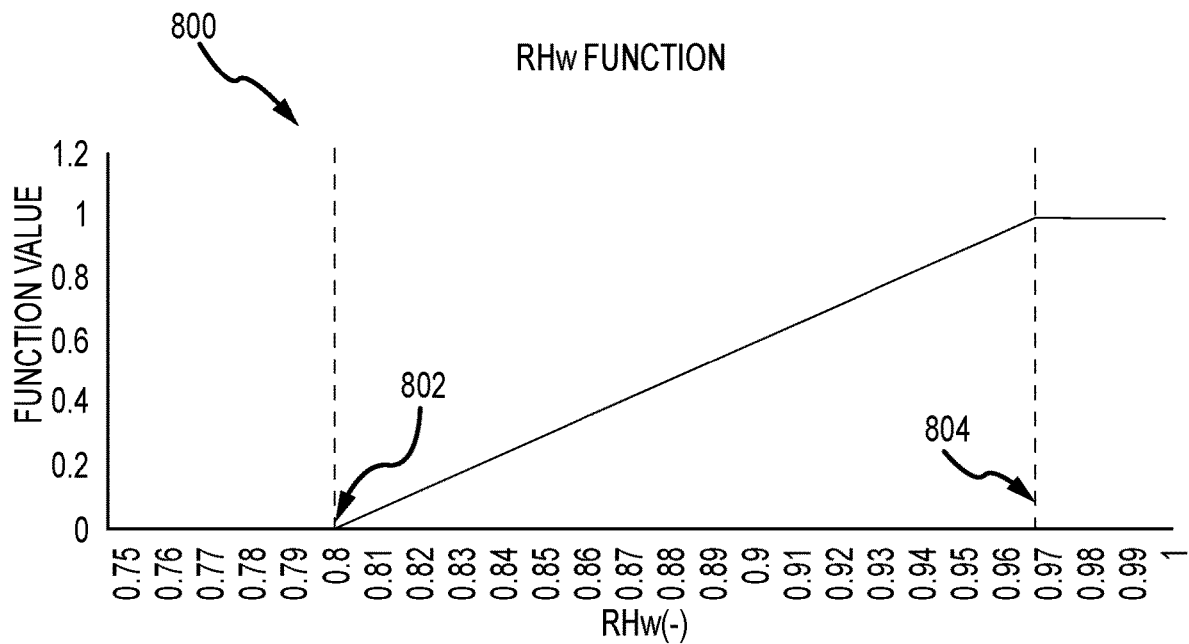
FIG. 8 depicts chart 800 in accordance with an embodiment.

FIG. 8 depicts example membership function 800 for RHw. Like example membership function 600, membership function 800 does not contribute to SI 318 for values of RHw below a left y=0 value 802, and it provides fixed values of 1 for RHw values that are above left y=1 804. Between the left y=0 value and left y=1 values, membership function 800 scales between 0 and 1 for LWC and RHw criterion. By providing fuzzy membership, membership function 800 may help determine with greater certainty when RHw contributes to potentially valuable seeding opportunities by allowing for uncertainty in the weather data.

In embodiments, SI 316 may be calculated based on the following expression:

$$SI = Wt_{LWC} * \sqrt{f(T) * f(LWC)} + Wt_{RHw} * \sqrt{f(T) * f(RHw)}, \quad \text{(Equation 4)}$$

where $Wt_{LWC}$ is a liquid water content weight $Wt_{RHw}$ is a relative humidity with respect to water weight.

In the example of Equation 4, applying temperature membership function $f(T)$ to every term of Equation 4 may improve estimating SI 316, and therefore determining that the microphysical conditions necessary for cloud seeding are present, because temperature is a necessary condition for seed nucleation.

Equation 4 includes weight $Wt_{RHw}$. In embodiments, $Wt_{RHw}$ may be nonzero. In further embodiments, at least one of $Wt_{LWC}$ or $Wt_{RHw}$ may have a value less than one. In further embodiments, each of the $Wt_{LWC}$ and the $Wt_{LWC}$ may have a value between zero and one. In addition to allowing for scaling of the SI values between predetermined minimum and maximum values, for example 0 and 1, the use of weights $Wt_{LWC}$ and $Wt_{RHw}$ may allow for the ranking the contributions of different microphysical features that may contribute to successful cloud seeding in the SI.

In examples, method 400 may further include step 406. In step 406, a relative humidity with respect to ice (RHi) 312 for each respective grid point 106 of the plurality of grid points may be received. RHi 312 is the ratio of the vapor pressure to the saturation vapor pressure with respect to ice. RHi 312 may allow for the identification of conditions that provide supersaturation of moisture with respect to ice, which are necessary for cloud seed deposition and condensation nucleation.

Like RHw 314, RHi 312 may be received from weather module 202, and may include observed or a predictive-model generated data.

In a further example, SI 316 may be calculated based on the temperature T 308, LWC 310, the $f(LWC)$, the RHi 312, and a relative humidity with respect to ice membership function $f(RHi)$. In a further example, however, SI 316 may be calculated based on the temperature T 308, LWC 310, the $f(LWC)$, the RHi 312, the $f(RHi)$, the RHw 314, and the $f(RHw)$.

Figure 7:
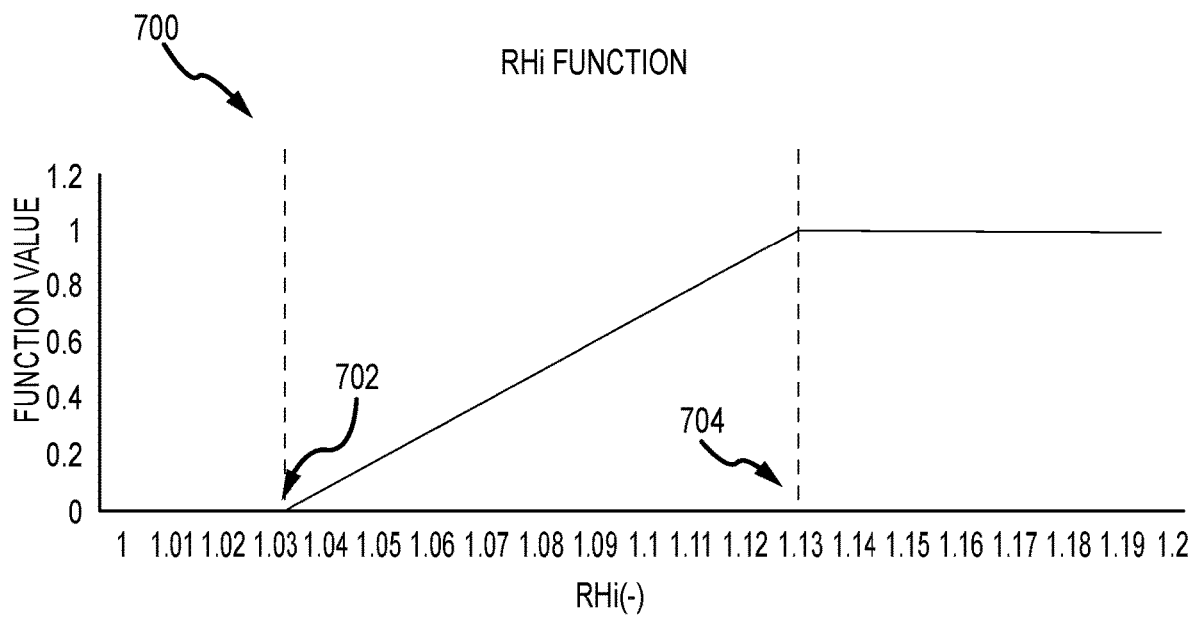
FIG. 7 depicts chart 700 in accordance with an embodiment.

FIG. 7 depicts example membership function 700 for RHi. Like example membership functions 600 and 800, membership function 700 does not contribute to SI 318 for values of RHi below a left y=0 value 702, and it provides fixed values of 1 for RHi values that are above left y=1 704. Between the left y=0 value and left y=1 values, membership function 700 scales between 0 and 1 RHi, criterion.

In embodiments, SI 316 may be calculated based on the following expression:

$$SI = Wt_{LWC} * \sqrt{f(T) * f(LWC)} + Wt_{RHi} * \sqrt{f(T) * f(RHi)} + Wt_{RHw} * \sqrt{f(T) * f(RHw)}, \quad \text{(Equation 5)}$$

where $Wt_{RHi}$ is a relative humidity with respect to ice weight.

Equation 5 includes weight $Wt_{RHi}$, which may be nonzero, have a value less than one, or may have a value between zero and one. In one example, $Wt_{LWC}$ may equal 0.5, $Wt_{RHi}$ may equal 0.3 and $Wt_{RHw}$ may equal 0.2, providing SI values that conveniently scale between 0 and 1.

The values of example membership functions 700 and 800 are summarized in Table 2 below.

TABLE 2

| Criteria | Left y = 0 | Left y = 1 | Right y = 1 | Right y = 0 |
|---|---|---|---|---|
| RHi | 1.03 | 1.13 | — | — |
| RHw | 0.8 | 0.97 | — | — |

In examples, method 400 may further include any of steps 414, 416, 418, and 420. In step 414, a wind direction (WDIR) may be received for each respective grid point 106 of the plurality of grid points associated with a target region 104. WDIR may help determine the probable horizontal dispersion of cloud seeding particles.

In step 416, a planetary boundary layer height (PBLH) may be received for each respective grid point of the plurality of grid points. The planetary boundary layer, also known as the atmospheric boundary layer, is the lowest part of the Earth's atmosphere. The planetary boundary layer is positioned below the free atmosphere, and its behavior is directly influenced by contact with the Earth's surface. The PBLH may help determine the probable vertical dispersion of cloud seeding particles.

In step 418, a wind speed (WSPD) may be received for each respective grid point of the plurality of grid points. The WSPD may help determine a flight track location with respect to the target.

WDIR, PBLH, and WSPD may each be received from weather module 202, and may include observed or a predictive-model generated data.

In step 420, a dispersion index (DI) 342 may be calculated for each respective grid point of the plurality of grid points. In examples, DI 342 may be calculated differently for ground and airborne seeding scenarios to support the identification of seeding cases.

The following formula may be used to determine DI for ground seeding opportunities:

$$DI_{gs} = f(WDIR_{GS}) * f(PBLH), \quad \text{(Equation 6)}$$

with $f(WDIR_{GS})$ being the wind direction membership function for ground seeding and $f(PBLH)$ being the membership function for planetary boundary layer height. In practice, $f(WDIR_{GS})$ is often dependent on the geography of target region 104.

Figure 10:
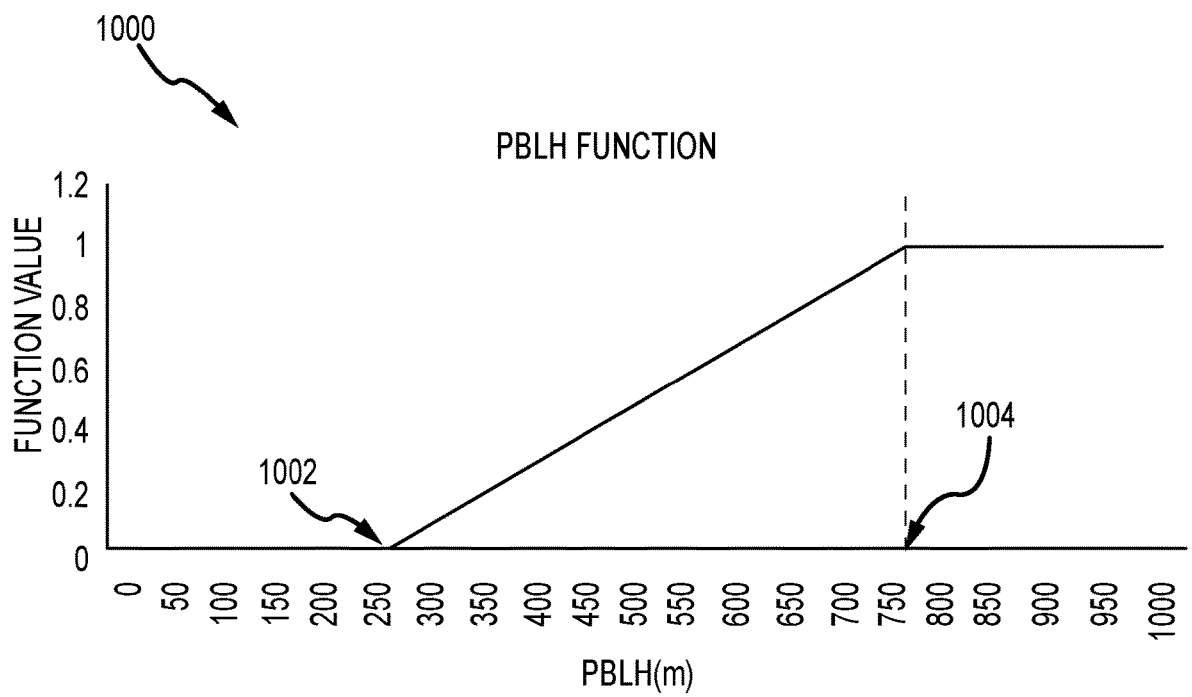
FIG. 10 depicts chart 1000 in accordance with an embodiment.
Figure 11:
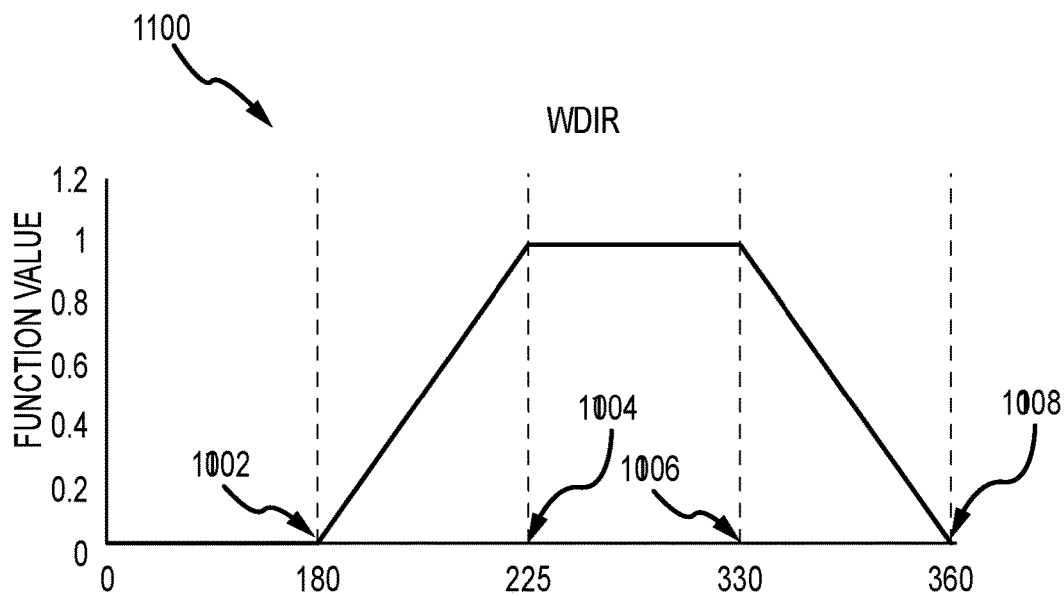
FIG. 11 depicts chart 1100 in accordance with an embodiment.
Figure 12:
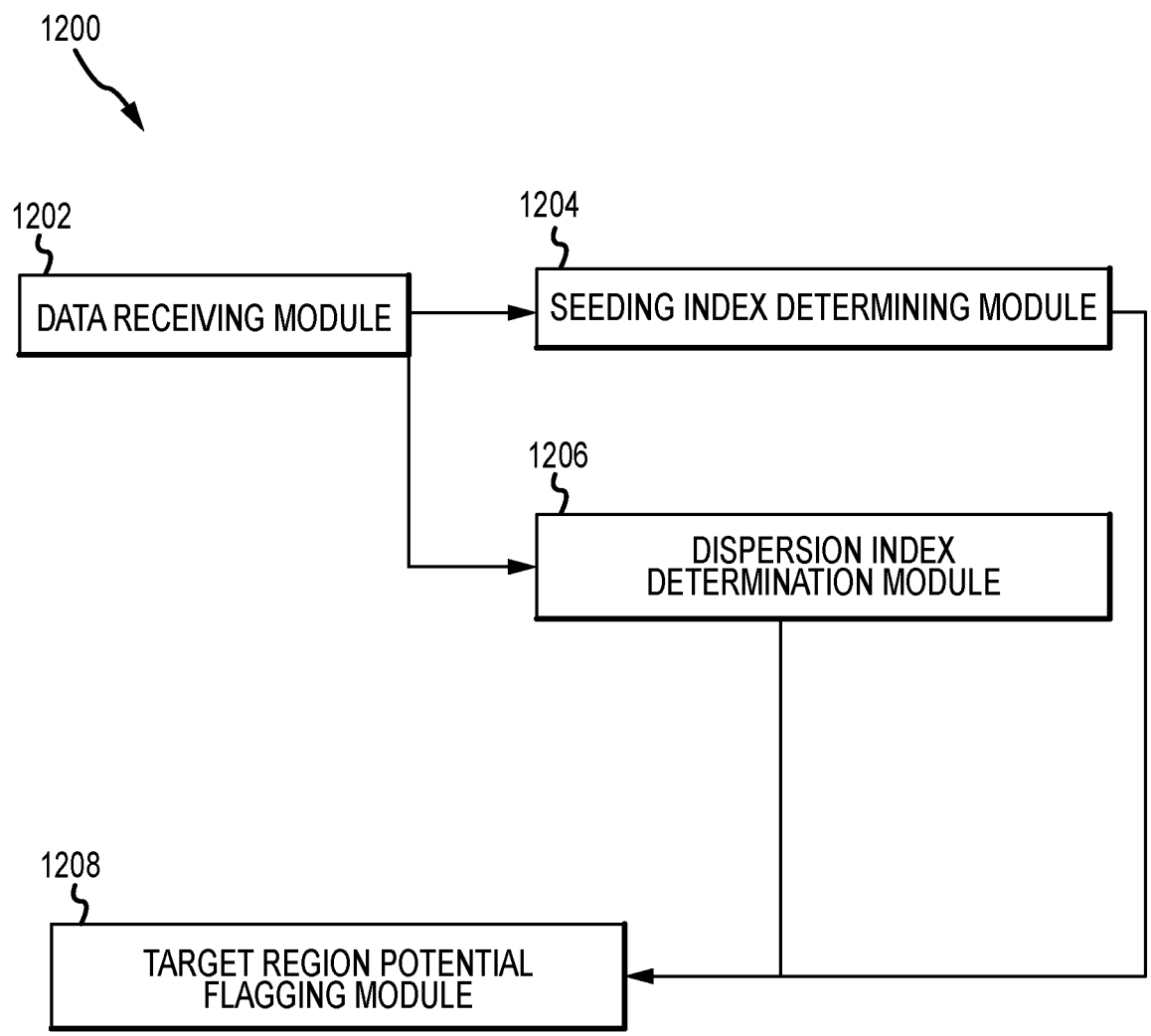
FIG. 12 depicts system 1200 in accordance with an embodiment.

FIG. 10 depicts an example membership function 1000 for PBLH, which is shaped much like membership functions 600, 700, and 800. Membership function 1000 scales up from zero at a left y=0 value 1002 and reaching a value of 1 at a left y=1 value 1004.

FIG. 11 depicts an example membership function 1100 for WDIR. By contrast to membership function 1000, membership function 1100 is shaped much like membership function 900, providing a stepped profile at criteria values left y=0 1102, left y=1 1104, right y=1 1106, and right y=0 1108. This is because, like temperature, there is a defined range within which WDIR may provide dispersion conditions for cloud seeding. Membership function 1100 captures some of the region outside of this range to identify potential cloud seeding opportunities when there is uncertainty in the weather data.

Example membership functions 1000 and 1100 are not intended to be limiting. In examples, membership functions 1000 and 1100 may include different left y=0, left y=1, right y=0, right y=1, values, different profile shapes, non-linear regions, or any other feature known to those of skill.

A set of example values for membership functions 1000 and 1100 are summarized in Table 2 below:

TABLE 2

| Criteria | Left y = 0 | Left y = 1 | Right y = 1 | Right y = 0 |
|---|---|---|---|---|
| WDIR (deg) | 180 | 225 | 330 | 360 |
| PBLH (m) | 250 | 750 | — | — |

To determine the DI 342 for the airborne seeding scenario, WDIR may help determine a flight track orientation, and WSPD may determine how far away the flight track is from the target region.

For example, in an airborne cloud seeding program with fixed tracks design, WDIR may correlate to a track number (for example tracks 1 or 2), and the wind speed may correlate to a letter indicating how far the track is from the target position (for example, track A may correlate to a WSPD that is less than 10 m/s, track B may correlate to a WSPD between 10 and 20 m/s, e.g.). In this way, each grid point 106 in a target region 104 may be rated with a number and a letter (for example, rating 1A is closer to a grid point 106 than rating 1B). The most frequently occurring track number and letter rating for a target area may be used to determine the best predicted seeding track for a target region 104 for airborne seeding.

In embodiments, step 422 may include further steps. For example, step 422 may include any of the steps of method 500 applied to a dispersion index (DI) set 344.

For example, step 422 may include steps 502 and 504. Step 502, may be applied to the DI set 334 to determine an average dispersion index (DI) set value 352. Similarly, step 504 may be applied to DI set 334 to determine whether the average dispersion SI set value 352 is greater than a first dispersion index (DI) threshold 354.

In embodiments, average DI set value 352 may be the greater of a mean dispersion index set value 356 and a median dispersion index set value 358.

In embodiments, step 422 may further include steps 508 and 510. Step 508, may be applied to the DI to determine a $75^{th}$ percentile dispersion index (DI) set value 360 of DI set 344. Step 510 may be applied to DI set 344 to determine if the $75^{th}$ percentile DI set value 360 minus a second dispersion index (DI) threshold 362 is greater than the first DI threshold 354 minus the average DI set value 352, wherein the second DI threshold 362 is greater than the first DI threshold 354.

In examples, a DI set 344 may correspond to a first time period, and determining whether to a set target region opportunity flag at step 506 may also correspond to that first time period. Upon moving to the next record at step 512, however, method 500 may evaluate the D1 set 344 for a second time period. This may provide a time series of target region opportunity flags 328 that illustrate how cloud seeding opportunities change for target region 104.

In embodiments, step 422 may comprise applying method 500 to each of SI set 318 and DI set 344, and determining that both the SI set 318 and DI set 344 both result in setting target region potential flag 328 using method 500. In examples, the common or overlapped target region opportunity flags 328 between SI set 318 and DI 344 may identify suitable ground seeding opportunities.

In embodiments, the plurality of grid points may represent a three-dimensional distribution of grid points.

In embodiments, method 400 may further include step 410. In step 410, additional data for each respective grid point of the plurality of grid points may be received. In embodiments, the additional data may include at least one of a vertical velocity, a net condensation rate, and a precipitation rate. Calculating the SI for each respective grid point of the plurality of grid points may be further based on the additional data.

FIG. 12 depicts a system 1200 for determining whether target region 104 provides a cloud seeding opportunity. System 1200 includes a data receiving module 1202, a seeding index determination module 1204, and target region potential flagging module 1208.

Data receiving module 1202 is configured to receive a temperature T for each respective grid point of a plurality of grid points within the target region, to receive a liquid water content (LWC) for each respective grid point of the plurality of grid points, and to receive a relative humidity with respect to water (RHw) for each respective grid point of the plurality of grid points, as described above.

Seeding index determination module 1204 is configured to calculate a seeding index (SI) for each respective grid point of the plurality of grid points to determine a seeding index (SI) set for the target region, the seeding index being calculated based on based on the temperature T, a temperature membership function $f(T)$, the LWC, a liquid water content membership function $f(LWC)$, the RHw, and a relative humidity with respect to water membership function $f(RHw)$, as described above.

Target region potential flagging module 1208 may be configured to set a target region opportunity flag 328 based on the SI set 318. In embodiments, the target region opportunity flagging module may be configured to determine an average seeding index (SI) set value 330, and upon determining that the average SI set value 330 is greater than a first seeding index threshold 332, set the target region opportunity flag 328, as described above.

In embodiments, the target region opportunity flagging module may be further configured to determine a $75^{th}$ percentile seeding index (SI) set value 338 of the SI set 318, and upon determining that the $75^{th}$ percentile SI set value 338 minus a second seeding index (SI) threshold 340 is greater than the first SI threshold 332 minus the average SI set value 330, set the target region opportunity flag 328, with the second SI threshold 340 being greater than the first SI threshold 332, as described above.

In embodiments, system 1200 may further include a dispersion index determination module 1206. In embodiments, dispersion index determination module 1206 may be configured to receive a wind direction (WDIR) for each respective grid point of the plurality of grid points, receive a wind speed (WSPD) for each respective grid point of the plurality of grid points, and calculate a dispersion index (DI) for each respective grid point of the plurality of grid points, as described above.

In further embodiments, dispersion index determination module 1206 may be configured to receive a wind direction (WDIR) for each respective grid point of the plurality of grid points, receive a planetary boundary layer height (PBLH) for each respective grid point of the plurality of grid points, and calculate a dispersion index (DI) for each respective grid point of the plurality of grid points, the $DI=\sqrt{f(WDIR)*f(PBLH)}$, as described above.

In embodiments, dispersion index determination module 1206 may be further configured to determine an average dispersion index (DI) set value 352, and determine that the average dispersion SI set value 352 is greater than a first dispersion index (DI) threshold 354.

In embodiments, dispersion index determination module 1206 may be further configured to determine a 75th percentile dispersion index (DI) set value 360 of the DI set 334, and determine that the 75th percentile DI set value 360 minus a second dispersion index (DI) threshold 362 is greater than the first DI threshold 354 minus the average DI set value 352, wherein the second DI threshold 362 is greater than the first DI threshold 354.

By evaluating atmospheric microphysics and dispersion conditions with fuzzy logic membership functions, it is possible to identify more types of weather events that present cloud seeding opportunities with a high confidence level.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A method for determining whether a target region provides a cloud seeding opportunity, the method comprising:
   receiving a temperature T for each respective grid point of a plurality of grid points within the target region;
   receiving a liquid water content (LWC) for each respective grid point of the plurality of grid points;
   calculating a seeding index (SI) for each respective grid point of the plurality of grid points to determine a seeding index (SI) set for the target region, the SI being calculated based on the temperature T, a temperature membership function $f(T)$, the LWC, and a liquid water content membership function $f(LWC)$;
   determining an average seeding index (SI) set value based on the SI set;
   determining a $75^{th}$ percentile seeding index (SI) set value of the SI set;
   upon determining that the $75^{th}$ percentile SI set value minus a second seeding index (SI) threshold is greater than a first SI threshold minus the average SI set value, setting the target region potential flag, wherein the second SI threshold is greater than the first SI threshold; and
   upon determining that the target region potential flag is set, applying a cloud seeding chemical to the target region.

2. The method of claim 1, wherein the $SI=Wt_{LWC}*\sqrt{f(T)*f(LWC)}$, and wherein a liquid water content weight $(Wt_{LWC})$ is nonzero.

3. The method of claim 1, further comprising:
   receiving a relative humidity with respect to water (RHw) for each respective grid point of the plurality of grid points; and
   wherein the $SI=Wt_{LWC}*\sqrt{f(T)*f(LWC)}+Wt_{RHw}*\sqrt{f(T)*f(RHw)}$, wherein $f(RHw)$ is a relative humidity with respect to water membership function, and a liquid water content weight $(Wt_{LWC})$ and a relative humidity with respect to water weight $(Wt_{RHw})$ are nonzero.

4. The method of claim 1, further comprising:
   calculating a dispersion index (DI) for each respective grid point of the plurality of grid points to determine a dispersion index (DI) set for the target region.

5. The method of claim 4, wherein calculating the DI for each respective grid point of the plurality of grid points further comprises:
   receiving a wind direction (WDIR) for each respective grid point of the plurality of grid points;
   receiving a planetary boundary layer height (PBLH) for each respective grid point of the plurality of grid points; and
   wherein the $DI=\sqrt{f(WDIR)*f(PBLH)}$.

6. The method of claim 4, wherein calculating the DI for each respective grid point of the plurality of grid points further comprises:
   receiving a wind direction (WDIR) for each respective grid point of the plurality of grid points;
   receiving a wind speed (WSPD) for each respective grid point of the plurality of grid points; and
   wherein the DI is determined based on the wind direction (WDIR) and the wind speed (WSPD).

7. The method of claim 4, wherein setting the target region potential flag further comprises determining an average dispersion index (DI) set value; and wherein setting the target region potential flag further comprises determining that the average dispersion DI set value is greater than a first dispersion index (DI) threshold.

8. The method of claim 7, wherein setting the target region potential flag based on the DI set further comprises determining a $75^{th}$ percentile dispersion index (DI) set value of the DI set; and setting the target region potential flag further comprises determining that the $75^{th}$ percentile DI set value minus a second dispersion index (DI) threshold is greater than the first DI threshold minus the average DI set value, wherein the second DI threshold is greater than the first DI threshold.

9. The method of claim 1, further comprising:
receiving additional data for each respective grid point of the plurality of grid points, the additional data including at least one of a vertical velocity, a net condensation rate, and a precipitation rate, and
wherein calculating the SI for each respective grid point of the plurality of grid points is further based on the additional data.

10. A system for determining whether a target region provides a cloud seeding opportunity, the system comprising:
a data receiving module configured to receive a temperature T for each respective grid point of a plurality of grid points within the target region, to receive a liquid water content (LWC) for each respective grid point of the plurality of grid points;
a seeding index module configured to calculate a seeding index (SI) for each respective grid point of the plurality of grid points to determine a seeding index (SI) set for the target region, the seeding index being calculated based on the temperature T, a temperature membership function $f(T)$, the LWC, and a liquid water content membership function $f(LWC)$, the seeding index module further configured to determine an average seeding index (SI) set value based on the SI set and determine a $75^{th}$ percentile seeding index (SI) set value of the SI set;
a target region potential flagging module configured to determine that the $75^{th}$ percentile SI set value minus a second seeding index (SI) threshold is greater than a first SI threshold minus the average SI set value and set the target region potential flag, wherein the second SI threshold is greater than the first SI threshold, and
a could seeding equipment module configured to, upon determining that the target region potential flag is set, apply a cloud seeding chemical to the target region.

11. The system of claim 10, wherein the SI=$Wt_{LWC}$*$\sqrt{f(T)*f(LWC)}$, wherein a liquid water content weight ($Wt_{LWC}$), is nonzero.

12. The system of claim 10, wherein the data receiving module is further configured to receive a relative humidity with respect to water (RHw) for each respective grid point of the plurality of grid points, and the SI=$Wt_{LWC}$*$\sqrt{f(T)*f(LWC)}$+$Wt_{RHw}$*$\sqrt{f(T)*f(RHw)}$, wherein $f(RHw)$ is a relative humidity with respect to water membership function, and a liquid water content weight ($Wt_{LWC}$) and a relative humidity with respect to water weight ($Wt_{RHw}$) are nonzero.

13. The system of claim 10, further comprising a dispersion index calculating module configured to receive a wind direction (WDIR) for each respective grid point of the plurality of grid points, receive a planetary boundary layer height (PBLH) for each respective grid point of the plurality of grid points, and calculate a dispersion index (DI) for each respective grid point of the plurality of grid points, the DI=$\sqrt{f(WDIR)*f(PBLH)}$.

14. The system of claim 10, further comprising a dispersion index calculating module configured to receive a wind direction (WDIR) for each respective grid point of the plurality of grid points, receive a wind speed (WSPD) for each respective grid point of the plurality of grid points, and calculate a dispersion index (DI) for each respective grid point of the plurality of grid points based on the wind direction (WDIR) and the wind speed (WSPD).

15. The system of claim 10, wherein the target region potential flagging module is further configured to determine an average dispersion index (DI) set value, and determine that the average dispersion DI set value is greater than a first dispersion index (DI) threshold.

16. The system of claim 15, wherein the target region potential flagging module is further configured to determine a $75^{th}$ percentile dispersion index (DI) set value of the DI set, and determine that the $75^{th}$ percentile DI set value minus a second dispersion index (DI) threshold is greater than the first DI threshold minus the average DI set value, wherein the second DI threshold is greater than the first DI threshold.

* * * * *